United States Patent [19]
Ash

[11] Patent Number: 5,921,649
[45] Date of Patent: Jul. 13, 1999

[54] POLYKETONE COMPOSITE

[75] Inventor: Carlton Edwin Ash, Sugar Land, Tex.

[73] Assignee: Shell Oil Company, Houston, Tex.

[21] Appl. No.: 09/135,869

[22] Filed: Aug. 18, 1998

Related U.S. Application Data

[60] Provisional application No. 60/091,569, Jul. 2, 1998, abandoned.

[51] Int. Cl.[6] .......................... C08G 63/48; C08G 67/02; C08F 283/00
[52] U.S. Cl. ........................... 325/64; 525/379; 525/471; 525/539; 528/220; 528/392
[58] Field of Search ............... 525/64, 379, 471, 525/539; 528/220, 392

[56] References Cited

U.S. PATENT DOCUMENTS

| | | | |
|---|---|---|---|
| 4,808,699 | 2/1989 | Van Broekhoven et al. | 528/392 |
| 4,816,530 | 3/1989 | Lutz et al. | 525/472 |
| 4,868,282 | 9/1989 | Van Broekhoven et al. | 528/392 |
| 4,880,903 | 11/1989 | Van Broekhoven et al. | 528/392 |
| 4,954,570 | 9/1990 | Smutny | 525/185 |
| 5,043,389 | 8/1991 | Gergen et al. | 525/179 |
| 5,064,901 | 11/1991 | Machado | 525/92 |
| 5,210,137 | 5/1993 | Machado | 525/154 |
| 5,232,786 | 8/1993 | Waters et al. | 428/475.8 |
| 5,300,338 | 4/1994 | Byrd, Jr. et al. | 428/36.6 |
| 5,369,170 | 11/1994 | Weinkauf | 525/64 |
| 5,637,410 | 6/1997 | Bonner et al. | 428/516 |

OTHER PUBLICATIONS

Bonding Aliphatic Polyketones to Incompatible Polyolefin Polymers, Research Disclosures, Jan. 1997, pp. 11–12.

*Primary Examiner*—Duc Truong
*Attorney, Agent, or Firm*—Todd F. Volyn

[57] ABSTRACT

A composite of a polyketone and an amine modified acid copolymer having low acid content is presented. The composite may also have additional layers of other polymers such as polyolefins. Processes for making these composite and a kit of parts suitable for making these composites are also presented.

20 Claims, No Drawings

POLYKETONE COMPOSITE

This application claims the benefit of U.S. Provisional Application No. 60/091,569, filed Jul. 2, 1998, the entire disclosure of which is hereby incorporated by reference, now abandoned.

BACKGROUND OF THE INVENTION

This invention relates to composites of aliphatic alternating polyketones and other polymers such as polyolefins.

Combinations of polymers are commercially important because of their potential to combine valuable attributes of a number of different polymers. Blending polymers can give desirable combinations of attributes such as barrier and cost, chemical resistance and dimensional stability, and toughness and strength. Some examples of applications in which multilayer structures of two or more polymers are widely used include barrier packaging and pipe applications where the barrier properties of one material are combined with the mechanical properties of less expensive materials. Most polymer combinations have poor miscibility resulting in blends that are not a single phase. Nonmiscible polymers frequently do not have enough interaction to generate strong interfacial bonding. This weak interfacial bonding can lead to delamination and loss of properties. Compatibilization of the polymer/polymer interface refers to lowering interfacial tension or improving the physical or chemical interaction of the polymers in combination. It is of critical importance since it leads to the strong interfacial bonds necessary to achieve and maintain the desired properties of the combination. For example, it prevents or reduces the ingress of water and other liquids such as hydrocarbons.

Polymers of carbon monoxide and ethylenically unsaturated hydrocarbons commonly referred to as aliphatic alternating polyketones (hereafter, "polyketones") are now well known. High molecular weight alternating aliphatic polyketones are of considerable interest because they exhibit a good overall set of physical and chemical properties. They have excellent mechanical properties, chemical resistance, and barrier properties which makes them particularly attractive for use in combination with other polymers. This class of polymers is disclosed in numerous U.S. patents assigned to Shell Oil Company as exemplified by U.S. Pat. Nos. 4,880,903 and 5,369,170 which are incorporated herein by reference.

U.S. Pat. No. 5,369,170 to Weinkauf discloses a polymer composition which is a combination of a polyketone polymer, a polymer which is not miscible with the polyketone, and a compatibilizing polymer obtainable by reacting a diamine with a polymer having carboxyl groups. A maleic anhydride graft copolymer reacted with a diamine having two primary amino groups is such a compatibilizer. Graft or copolymerized acid copolymers (e.g., acrylic acid copolymers) also comprise such compatibilizers. Further refinements of this technology are discussed by Ash et. al. in *Bonding Aliphatic Polyketones to Incompatible Polyolefin Polymers,* Research Disclosures, January 1997, pp. 11,12 (Kenneth Mason Publications).

U.S. Pat. No. 5,637,410 to Bonner et. al. is directed to adhesive blends of polyolefins. The blends are carboxylic acid derivative graft polymers and a low density polyethylene reacted in the presence of a diamine. The preferred graft polymer is a maleic anhydride graft polyethylene. Multilayer structures made of these blends together with polyketones are also described.

The polymer compositions of the U.S. Pat. No. 5,369,170 patent can be produced in the form of a blend obtained by a melt blending process. In this type of process the compatibilizing polymer is thought to be present as a layer between the polyketone and the polymer to which it is bound. Multilayer structures can also be prepared by coextrusion to make such articles as multilayer pipes and multilayer sheets and films. The compatibilizing polymer can also be used as a coating layer for a polyketone object, in which case no second polymer need be present.

The preparation and use of the compositions of the U.S. Pat. Nos. 5,369,170 and 5,637,410 patents is not trouble free. For example, when the compatibilizers comprise maleated polymers, a stoichiometric excess of amine is typically required. Further, when the compatibilizers comprise carboxylic acid groups, as they may under the U.S. Pat. No. 5,369,170 patent, lengthy processing times in the melt can lead to increases in melt viscosity and a tendency to form gels. This can lead to poor melt stability, the formation of bubbles or lumps and an uneven distribution of layers in multilayer structures resulting in the so-called wave pattern in processed polymer. Further, the gels may deteriorate polymer performance by, for example, acting as stress concentrators thereby decreasing impact resistance. Without being bound to theory, it is believed that melt stability problems are caused by crosslinking.

Recently it has been found that improvements to multilayer structures using polyketones can be obtained by employing a compatibilizing polymer which is the reaction product of a particular type of amine and a polymer comprising carboxylic acid groups (i.e., hydroxycarbonyl groups). The amine comprises a primary amino group which is attached to an aliphatic carbon atom which carries at most one hydrogen atom. This affords some measure of steric hindrance to the amine. Compositions made from this combination show a reduced tendency to crosslink in the melt. While the interfacial attraction of the materials used in this combination is acceptable for many applications, further enhancements in adhesion are still desirable for many other applications.

Additional methods and compositions for combining polyketones with different polymers that lessen the propensity towards crosslinking and poor melt stability yet display improved interfacial attractions would enhance the utility of polyketones. This is particularly true in the case of multilayer structures and articles made from them.

SUMMARY OF THE INVENTION

The invention is a composition comprising a polyketone, an optional second polymer which is not miscible with the polyketone, and an amine modified hindered acid copolymer.

In one embodiment of the invention, the acid copolymer comprises 0.015–2.04 mole % carboxylic acid groups (based on moles of carbolxylic acid monomer units per total number of moles of monomer units).

In another embodiment of the invention, the acid copolymer comprises 0.34–1.73 mole % carboxylic acid groups.

The invention is also a process for preparing the polymer compositions of this invention which comprises contacting polyketone and, optionally, the second polymer with the amine modified hindered acid copolymer.

In addition, the invention is a kit of parts suitable for producing a composition according to this invention comprising, (a) a polyketone part, (b) an optional, second polymer part which is not miscible with the polyketone, and (c) an amine modified hindered acid copolymer.

DETAILED DESCRIPTION

The polyketone polymers which are employed in this invention are of an alternating structure and contain substantially one molecule of carbon monoxide for each molecule of ethylenically unsaturated hydrocarbon. The portions of the polymer attributable to CO alternates with those attributable to the ethylenically unsaturated hydrocarbon.

It is possible to employ a number of different ethylenically unsaturated hydrocarbons as monomers within the same polymer but the preferred polyketone polymers are copolymers of carbon monoxide and ethylene or terpolymers of carbon monoxide, ethylene and a second ethylenically unsaturated hydrocarbon of at least 3 carbon atoms, particularly an α-olefin such as propene. Additional monomers can also be used and still come within the scope of polyketone polymers described herein. That is, polyketone polymers can be made from four, five, or more combinations of monomers. Such polyketone polymers are aliphatic in that there is an absence of aromatic groups along the polymer backbone. However, alternating polyketones may have aromatic groups substituted or added to side chains and yet still be considered alternating aliphatic polyketones.

When the preferred polyketone terpolymers are employed, there will be within the terpolymer at least about 2 units incorporating a moiety of ethylene for each unit incorporating a moiety of the second or subsequent hydrocarbon. Preferably, there will be from about 10 units to about 100 units incorporating a moiety of the second hydrocarbon. The polymer chain of the preferred polyketone polymers is therefore represented by the repeating formula

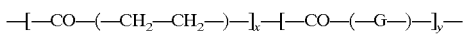

where G is the moiety of ethylenically unsaturated hydrocarbon of at least three carbon atoms polymerized through the ethyllenic unsaturation and the ratio of y:x is no more than about 0.5. When copolymers of carbon monoxide and ethylene are employed in the compositions of the invention, there will be no second hydrocarbon present and the copolymers are represented by the above formula wherein y is zero. When y is other than zero, i.e. terpolymers are employed, the —CO—(—CH$_2$—CH$_2$—)— units and the —CO—(—G)— units are found randomly throughout the polymer chain, and preferred ratios of y:x are from about 0.01 to about 0.1. The precise nature of the end groups does not appear to influence the properties of the polymer to any considerable extent so that the polymers are fairly represented by the formula for the polymer chains as depicted above.

Of particular interest are the polyketone polymers of number average molecular weight from about 1000 to about 200,000, particularly those of number average molecular weight from about 20,000 to about 90,000 as determined by gel permeation chromatography. The physical properties of the polymer will depend in part upon the molecular weight, whether the polymer is a copolymer or a terpolymer, and in the case of terpolymers the nature of the proportion of the second hydrocarbon present. Typical melting points for the polymers are from about 175° C. to about 300° C., more typically from about 210° C. to about 270° C. The polymers have a limiting viscosity number (LVN), measured in m-cresol at 60° C. in a standard capillary viscosity measuring device, of from about 0.5 dl/g to about 10 dl/g, more frequently of from about 0.8 dl/g to about 4 dl/g. The backbone chemistry of aliphatic polyketones precludes chain scission by hydrolysis. As a result, they generally exhibit long term maintenance of their property set in a wide variety of environments.

The production of polyketone polymers is described in U.S. Pat. Nos. 4,808,699 and 4,868,282 to van Broekhoven, et al which issued on Feb. 28, 1989 and Sep. 19, 1989 respectively, and are herein incorporated by reference. U.S. Pat. No. 4,808,699 teaches the production of linear alternating polymers by contacting ethylenically unsaturated compounds and carbon monoxide in the presence of a catalyst comprising a Group VIII metal compound, an anion of a nonhydrohalogenic acid with a pKa less than 6 and a bidentate phosphorous, arsenic or antimony ligand. U.S. Pat. No. 4,868,282 teaches the production of linear alternating terpolymers by contacting carbon monoxide and ethylene in the presence of one or more hydrocarbons having an ethylenically unsaturated group with a similar catalyst.

The optional, second polymer may be an addition polymer or a condensation polymer. Where an addition polymer is used, preferably it is a polymer of one or more olefinically unsaturated compounds (i.e., a compound having carbon-carbon double bonds) polymerized through their olefinic unsaturation (or as a result of a rearrangement of the unsaturation during polymerization); for example, ethene, propene, butene-1, styrene, methyl(meth)acrylate, vinyl acetate or combinations thereof. Preferably the polymer is comprised of $C_{1-10}$ olefinically unsaturated hydrocarbon monomers; the well known polyolefins such as polyethylene, polypropylene, poly(butene-1) and polystyrene are preferred among this group. High density polyethylene (HDPE), (i.e., having a density greater than 930 kg/m$^3$) is desirable. Low density polyethylene and linear low density polyethylene (i.e., having a density less than 930 kg/m$^3$ are also suitable. Isotactic polypropene is the preferred polypropene. Condensation polymers include, for example, polyamides such as polyamide-6, polyamide-6,6, polyamide-11 and polyamide-12, and poly(phenylene oxide). Another class polymersuseful as the second polymer of this invention are functionalized polymers wherein the functionality is reactive with amine component. Acid copolymers and derivatives thereof such as maleated polypropylene, maleated styrene, and maleated polybutylene are examples of such second polymers.

The weight average molecular weight of the second polymer is in the range of 2,000–1,000,000, preferably 10,000–500,000, as determined by gel permeation chromatography. The crystalline melting point is about 80° to about 300° C., as measured by DSC, or, if the second polymer does not possess a crystalline melting point, its glass transition temperature is about –80 to about 200° C., as measured by DSC.

If the optional second polymer is present, the amine modified polymer preferably has good compatibility with the second polymer. For example, if the second polymer is a polyolefin, it would be preferred that the amine modified polymer is a polyolefin which comprises carboxylic acid groups. On the other hand, if the second polymer is a poly(phenylene-oxide), it would be preferred that the amine modified polymer is a polymer such as a polystyrene having hindered carboxylic acid groups.

The amine modified polymer may be prepared by melt blending an acid copolymer with a suitable amine. The acid copolymer is a copolymer in which at least one of the monomer units used to make the polymer is an ethylenically unsaturated carboxylic acid. The alpha carbon (with respect to the hydroxycarbonyl group) of the acid monomer is bonded to a functional group and is not directly bonded to a hydrogen atom; polymers made of such compositions are referred to herein as hindered acid copolymers and offer significant advantages in adhesion to polyketones when applied as described throughout this specification.

Although monocarboxylic acids are preferred monomers for the acid copolymer, the acid monomer may comprise a polycarboxylic acid such as a dicarboxylic acid or a tricarboxylic acid. The other monomer units of the acid copolymer are preferably olefinically unsaturated hydrocarbons such as one or more of the following: ethene, propene, butene-1, styrene, methyl(meth)acrylate, and vinyl acetate. Random copolymers of ethene or propene and R—$CR_1CO_2H$, wherein R is a $C_{1-10}$ olefinically unsaturated hydrocarbon and $R_1$ is a $C_{1-6}$ alkyl group are the preferred acid copolymers of this inventions with random poly (ethene-methacrylic acid) and random poly(propene-methacrylic) acid being the most preferred acid copolymers (particularly where the optional second polymer comprises polyethylene or polypropylene respectively).

The acid content of the acid copolymer is low. In the preferred embodiment in which the acid copolymer is an ethene-methacrylic acid copolymer, the acid content is, 0.015–2.04 mole % acid. Preferably, the acid content comprises 0.34–1.73 mole % and more preferably, 1.15–1.55 mole %. All references to mole % acid content herein are based on a calculation of the number of moles of the acid monomer relative to the total number of moles of all monomer units forming the polymer. Alternatively, a low molar content of acid (qualifying as low acid copolymer) can be attained by intermixing various quantities of acid copolymer such that the mole % acid content is in accord with the foregoing percentages based on the total acid content for the acid copolymer blend.

The melt flow index of the hindered acid copolymer is 0.1–35.0 g/10 min (based on ASTM D1238). Melt flow indices of 0.5–7 are preferred with 1–4 being most preferred.

The weight average molecular of the acid copolymer is 2000–1,000,000 as determined by gel permeation chromatography. The crystalline melting point of the acid copolymer is 80–300° C. (as measured by DSC) with 80–220° C. being preferred. If the acid copolymer does not have a crystalline melting point, its glass transition temperature is −80 to 200° C. (as measured by DSC). These parameters are preferably met through the use of poly(ethene-methacrylic acid) available from DuPont as "NUCREL" acid copolymers and having an acid content of about 4% wt and a melt flow index of about 3–7.

The amine component of the amine modified hindered acid copolymer has at least two amine functional groups and is of the form $NH_2$—R—$NH_2$ wherein R comprises $C_{4-24}$ substituted or unsubstituted aliphatic, cycloaliphatic, or aromatic groups or combinations thereof and may contain hetero atoms such as S, N, and O. Depending upon the composition of R, more than two amino groups may be present in the amine of this invention. It is most preferred that the amine component is an unhindered primary diamine. For the purposes of this specification, an unhindered amine component is of the form above wherein the carbon atoms to which each amine group is attached carries two hydrogen atoms. A few examples of suitable amines are 4,9-dioxadiamino-1,12-dodecane; 1,4-diaminobutane; 1,10-diaminodecane; 4,4'-diaminodiphenyl ether; 1,12-diaminododecane; 1,7-diaminoheptane; 1,6-diaminohexane; 1,3-diamino-2-hydroxypropane; 2,3-diaminonapthalene; 1,8-diaminooctane; 1,5-diaminopentane; 1,3-diaminopropane; 1,3-diamino-2-propanol; and 1,4-diamino-2-butanone. It is possible to use the amine in a wholly or partly neutralized form, i.e. as a salt of an acid. One or more amines can be used in combination. Additionally, the amine component can be a reagent which produces an amine of the type described above upon further chemical reaction such as hydrolysis. For example, imine reagents which produce amines upon contact with water can also be used to prepare the amine modified acid copolymers used in this invention.

An effective amount of amine is used to achieve the desired level of adhesion. The quantity of amine is preferably low. While a stoichiometric excess of acid copolymer can be used it is a particular advantage of this invention that as little as 0.01% mole amine/mole of acid (in the acid copolymer) can be used with good effect in some applications. One of ordinary skill in the art will recognize applications in which greater amounts of adhesion are required and will increase the relative proportion of amine accordingly. However, maximum adhesion is generally attained through the addition of no more than a stoichiometric quantity of amine.

The amine modified polymer of this invention may be made by melt blending the acid copolymer with the amine by any suitable means, for example via extruder or Brabender mixer. Suitable temperatures for melt blending are above 100° C., typically above 120° C., but generally below 300° C. A preferred temperature range is 150–220° C. If desirable, the preparation of the amine modified polymer may be effected simultaneously with a melt processing step which is carried out when preparing the composition of this invention as set forth below. It is also possible to perform the reaction between the amine and the third polymer by heating the reactants dissolved in a suitable solvent, for example, p-xylene, diethyleneglycol dimethylether and triethylene glycol dimethylether.

The polymer compositions of this inventions can be obtained by contacting the polyketone and (optionally) the second polymer with the amine modified polymer. Reaction of the polyketone with the amine modified polymer typically requires temperatures above 100° C. but generally below 300° C.

In one embodiment, the polymer composition of this invention is in the form of a blend in which the amine modified polymer acts as a compatabilizer. Such blends can be made by any melt blending process which affects an intimate blending of the components of the composition. Such processes are well known to those of ordinary skill in the art and include, for example, extrusion and combination in a Brabender mixer. The ratio of polyketone to the second polymer may vary within a broad range, for example between 5/95 and 95/5. Preferably, the range is between 10/90 and 90/10. A range between 20/80 and 80/20 is more preferred. The quantity of the amine modified polymer will generally relate to the quantity of the polyketone or of the second polymer if used as the minor component. Generally, it will comprise about 1–40% wt (based on weight of the minor component) with 2–20% wt being preferred.

In the preferred embodiment of this invention the polymer composition is in the form of a multilayer structure, in which the polyketone forms a first layer, the second polymer forms a second layer, and both layers are bonded together by an intermediate layer of amine modified polymer functioning as an adhesive layer. Compositions having four or more layers may also be formed with additional intermediate layers.

Such multilayer structures can be made, for example, by extruding a melt of the amine modified polymer in between the first and second layers which may be heated, e.g., at a temperature above 100° C. but below 270° C. simultaneously or in a later stage, thus effecting interfacial bonding. Other methods such as compression molding and co-injection molding can also be used. The most preferred method of making multilayer structures is a coextrusion process in which a melt of the amine modified polymer is extruded between a melt of polyketone and a melt of the second polymer. In such a coextrusion process, the three melts are brought together in a suitable multilayer manifold prior to exiting the die. The manifold is kept at a temperature of at least 150° C., preferably at least 180° C. but, generally less than 300° C. The most preferred range is 200–280° C. In the manifold the temperature is generally the highest of the extrusion temperatures. The total residence time in the manifold can vary from less than one minute to more than ten minutes. It is preferred that polymer having similar melt viscosities at the prevailing conditions be used. Making more extensive multilayer structures will require more streams of polymer melts be guided into the multilayer manifold. For example, a composite can be made from a layer of polyethylene followed by a layer of amine modified acid copolymer, followed by a layer of polyketone regrind, followed by a layer of amine modified acid copolymer, followed polyethylene regrind. Such composites improve the economics of multilayer constructions by using regrind layers but also permit the manufacturer to recognize the advantages of the properties of polyolefins together with those of polyketones.

The multilalyer structures may be processed further, for example, through regrind, by bending (e.g., tubes, pipes), by stretching (e.g., of sheet to form film) or by thermoforming or blow molding (e.g., to form a container).

In the multilayer structures of this invention, the thickness of the first and second layer will depend on application driven requirements. For example, the thickness may range from 5–5000 μm, for example, in a film or sheet application, to 0.1–100 mm in tubing and pipe applications. The thickness of the intermediate layer will frequently range from 5–1000 μm.

In another embodiment of this invention, no second layer is present. For example, the amine modified polymer can be applied directly to a polyketone layer (or vice versa) to be used as a coating. This can be done in any form in which either polymer may take. For example, tubes, pipe, and sheet can all be coated in this way.

In yet another embodiment of this invention, a multilayer structure is formed in which the amine modified poliymer is used as an adhesive between a layer of polyketone and a layer of another material which is not a thermoplastic polymer, for example glass, metal (such as aluminum or copper), or a thermosetting resin (such as a phenol-formaldehyde or epoxy resin). The considerations and conditions described above wherein a second polymer is used apply to the embodiments in which no second polymer is used. Additionally, successive applications of powder coatings of polyketone and aminated acid copolymer can also be used to adhere the combination to the surface of a substrate using well known powder coating techniques.

The polyketone, second polymer, and amine modified polymer may contain additives such as reinforcing fillers, non-reinforcing fillers, stabilizers, extenders, lubricants, pigments, plasticizers, and other polymeric materials to improve or otherwise alter its properties.

The compositions of this invention display excellent adhesion and an absence of gels, bubbles, or lumps. They also exhibit excellent performance properties such as impact resistance, chemical resistance and barrier properties. Multilayer structures can be formed with a good thickness of the various layers and do not show delamination in the presence of water or hydrocarbons.

The parts of the kit of parts suitable for producing the polymer compositions according to this invention may comprise any of the polymers in any suitable form. For example, liquids, powders, crumbs, and nibs are all suitable for this purpose.

The invention is further described by the following non-limiting examples.

EXAMPLE 1 (POLYKETONE FORMATION)

A terpolymer of carbon monoxide, ethene, and propene as produced in the presence of a catalyst composition formed from palladium acetate, the anion of triflouroacetatic acid and 1,3-bis(diphenylphosphino)propane. The melting point of the linear terpolymer was 220° C. and it had a limiting viscosity number (LVN) of 1.75 measured at 60° C. in m-cresol.

EXAMPLES 2–11

Various combinations of modified acid copolymers were coextruded with polyketones of Example 1 to form multilayer structures. The outerlayer was a HDPE commercially available from Petrothene as "LM60070" polyethylene. Acid Copolymer 1 is a random poly(ethene-methacrylic acid) copolymer having about 3.11 mole % acid content and a melt flow index of 3 and is commercially available from Du Pont as "NUCREL 903" polymer. Acid Copolymer 2 is a random poly(ethene-methacrylic acid) copolymer having about 1.34 mole % acid content and a melt flow index of 7 and is commercially available from Du Pont as "NUCREL 407" polymer. Acid Copolymer 3 is a random poly(ethene-methacrylic acid) copolymer having about 1.34 mole % acid content and a melt flow index of 3 produced by Du Pont. Acid Copolymer 4 is a randoom poly(ethene-acrylic acid) having an acid content of about 1.19 mole % and a melt flow index of 11 commercially available from Dow Chemical Co. as "PRIMACORE 3150" polymer. Amine A is 4,9-dioxadiamino-dodecane commercially available from BASF as "DODA" amine. Amine B is bis(4-aminocyclohexyl) methane commercially available as "AMICURE PACM" amine from Air Products. The polyketone (PK) comprised the inner layer.

The coextrusion was conducted using three single screw extruders (2×38 mm extruders and a 25 mm extruder) and a multilayer manifold and tubing die supplied by Geneca. A tubing of nominal outer diameter of 7.5–8.0 mm was produced with layer thicknesses of about 18 mil, 3–4 mil, and 16 mil for HDPE, tielayer, PK, respectively.

The polyketone was processed at a melt temperature between 240° C. and 260° C. The amine modified acid copolymer (as a tielayer) was processed through the 25 mm extruder at 160° C. except in Example 3 where it was processed at 200° C. The HDPE was processed at a melt temperature of 200–210° C. The three streams were processed through the die head at about 260° C.

A T-peel test was then conducted on the coextruded tubing. In this test, the tubing was sliced open longitudinally. The two main layers were separated on one end slightly by hand to produce two end tabs capable of being placed in an tensile tester. An Instron Model 1123 tensile tester was then used to determine the stress necessary to completely separate the layers at 90° to one another. The test was carried out at 23° C. with a crosshead speed of 127 mm/min. The T-peel adhesion is reported in units of force per unit width of the specimen.

Failure of the material under consideration was characterized as cohesive or adhesive by observation during the T-peel test. Cohesive failure occurs when the tielayer matrix itself is yielded and/or torn upon application of sufficient force. It indicates good interfacial adhesion between the tielayer(s) and the other polymers to which it is bound. Adhesive failure occurs when the tielayer simply separates from one or more other polymer layers to which it is bound during the course of the test. It indicates that the interfacial bond between tielayer and other polymer layers is lower than the overall tensile strength of the tielayer. The most desirable combination is high adhesion-cohesive failure, high adhesion, and a low rate of viscosity rise (preferably below about 75%). Materials which display adhesive failure may be acceptable provided that they display good adhesion and a low viscosity rise.

Viscosity rise was measured using a Kayeness capillary rheometer heated to 240° C. The sample was introduced and the apparent viscosities determined at a shear rate of $100 \, s^{-1}$. The percent viscosity rise was determined by comparing the viscosity at 25 minutes (unless otherwise indicated) to that at 3 minutes. A high rate of viscosity rise indicates a rapid rate of crosslinking.

Results are provided in the following Table.

| Ex. No. | Acid Copolymer | Amine (wt %) | Adhesion pli (N/mm) | Type Failure | % Viscosity Rise (240° C., 25 min) |
| --- | --- | --- | --- | --- | --- |
| 2* | 1 | A (0.25%) | 7.6 | Cohesive | 100 (10 min) |
| 3* | 1 | A (0.25%) | † | — | — |
| 4 | 1 | B (0.5%) | 2.91 | Adhesive | 69 |
| 5 | 2 | B (0.5%) | 1.46 | Adhesive | 4 |
| 6 | 2 | A (0.25%) | 3.00 | Adhesive | 25 |
| 7 | 2 | A (0.50%) | 3.00 | Cohesive | 38 |
| 8 | 2 | A (1.00%) | 1.76 | Cohesive | |
| 9 | 3 | A (0.25%) | 5.06 | Adhesive | 28 |
| 10 | 3 | A (0.50%) | 6.76 | Cohesive | 40 |
| 11* | 4 | A (0.25%) | † | † | 900 (15 min) |

*Comparative, not according to the invention.
†Excessive crosslinking on extrusion, composite not functional.

Comparing examples 2 and 3 with examples 4–10, it can be seen that while the composites made with high acid content amine modified polymers can display good adhesion, their melt stability is an order of magnitude less than that of the materials made according to the invention. That is, they tend to crosslink in the melt. Example 11 shows instability in the melt when an unhindered acid is used in the tielayer.

Examples 4 and 5 show that a low acid content amine-modified polymer having a relatively low MW (compared to those of examples 6–10) and a hindered amine promote adhesion and improve melt stability. In example 6, low acid content/low quantity unhindered amine modified polymers are seen to promote adhesion without undue losses in melt stability. This situation is further improved with the increase in the quantity of amine used in Example 7. Example 8 shows that further increases in amine quantity (doubling that of Example 7) do not necessarily contribute to adhesion. Example 10 shows that a low acid content, higher molecular weight hindered acid polymer modified with unhindered amine most effectively increases adhesion without sacrifice to melt stability. Example 9 shows the same effect (to a lessened degree) obtained with a lower quantity of amine.

EXAMPLE 12 (COMPARATIVE)

An amine modified polymer was prepared as follows. A random copolymer of ethene and methacrylic acid having an acid content of about 3.11 mole % (commercially available from DuPont as "NUCREL 903") was fed through a feed hopper to a 25 mm twin screw extruder. The feed rate of the random copolymer was 15 kg/h. 4,9-dioxa-1,12-diaminododecane (commercially available from BASF) was fed through the same feed hopper simultaneously at a rate of 38 g/h. The amine was used in a quantity of 0.023 mole/mole methacrylic acid present in the copolymer. The screw speed was 250 rpm. The barrel and the die were heated such that the melt temperature was 180° C. The melt was obtained in the form of a strand which was cooled in a water bath and granulated.

EXAMPLE 13 (COMPARATIVE)

Multilayer pipes of polyketone/amine modified polymer/high density polyethene were produced in a coextrusion line as follows.

A commercial size coextrusion line comprised a 25 mm single screw main extruder equipped with a mulilayer manifold with a die suitable for producing pipe, two 20 mm single screw side extruders and a suitable haul-off/cooling unit. The polyketone of example 1 was fed to the main extruder, which was operated with a screw speed of 24 rpm. The amine modified polymer of Example 12 (3.11 mole % acid) above was fed to the first side extruder, which was operated with a screw speed of 20 rpm. A low density polyethylene (commercially available from Montell as "Grade 25-020FA") was fed to the second side extruder, which was operated with a screw speed of 98 rpm. The extruder barrels and further equipment in contact with the polymer melts were heated such that the polymer melts adopted a temperature of 240° C. in the multilayer manifold and die. The line speed was 0.7 m/min.

The adhesion between the layers of pipes was good. However, after 15 minutes of the coextrusion run, inspection of the inner surface of the pipes revealed the appearance of gels and that the pipes had serious irregularities in the thickness of the layers.

I claim as my invention:

1. A polymer composition comprising a combination of a polyketone and an amine modified hindered acid copolymer having a low acid content.

2. The composition of claim 1 wherein said acid copolymer comprises 0.015–2.40 mole % acid (based on the number of moles of the acid monomer relative to the total number of moles of all monomer units forming the acid copolymer or blend thereof).

3. The composition of claim 2 wherein the acid copolymer comprises 0.34–1.73 mole % acid (based on the number of moles of the acid monomer relative to the total number of moles of all monomer units forming the acid copolymer or blend thereof).

4. The composition of claim 3 wherein the acid copolymer comprises 1.15–1.55 mole % acid (based on the number of moles of the acid monomer relative to the total number of moles of all monomer units forming the acid copolymer or blend thereof).

5. The composition of claim 1 wherein said amine modified hindered acid copolymer is modified with an unhindered amine.

6. The composition of claim 1 further comprising a polymer which is not miscible with said polyketone.

7. The composition of claim 1 further comprising a polyolefin and wherein said modified acid copolymer comprises poly(ethene-methacrylic acid) modified with an unhindered primary amine.

8. A process for preparing a polymer comprising the steps of contacting a polyketone with an amine modified hindered acid copolymer having a low acid content.

9. The process of claim 8 wherein said acid copolymer comprises 0.015–2.40 mole % acid (based on the number of moles of the acid monomer relative to the total number of moles of all monomer units forming the acid copolymer or blend thereof).

10. The process of claim 8 wherein the acid copolymer comprises 0.34–1.73 mole % acid (based on the number of moles of the acid monomer relative to the total number of moles of all monomer units forming the acid copolymer or blend thereof).

11. The process of claim 8 wherein the acid copolymer comprises 1.15–1.55 mole % acid (based on the number of moles of the acid monomer relative to the total number of moles of all monomer units forming the acid copolymer or blend thereof).

12. The process of claim 8 wherein said amine modified hindered acid copolymer is modified with an unhindered amine.

13. The process of claim 8 further comprising a polymer which is not miscible with said polyketone.

14. A kit of parts suitable for producing a composition comprising, a polyketone part and a low acid content amine modified hindered acid copolymer part.

15. The kit of parts of claim 14 wherein said acid copolymer comprises 0.015–2.40 mole % acid (based on the number of moles of the acid monomer relative to the total number of moles of all monomer units forming the acid copolymer or blend thereof).

16. The kit of parts of claim 14 wherein the acid copolymer comprises 0.34–1.73 mole % acid (based on the number of moles of the acid monomer relative to the total number of moles of all monomer units forming the acid copolymer or blend thereof).

17. The kit of parts of claim 14 wherein the acid copolymer comprises 1.15–1.55 mole % acid (based on the number of moles of the acid monomer relative to the total number of moles of all monomer units forming the acid copolymer or blend thereof).

18. The kit of parts of claim 14 wherein said amine modified hindered acid copolymer is modified with an unhindered amine.

19. The kit of parts of claim 14 further comprising a polymer part which is not miscible with said polyketone part.

20. The kit of parts of claim 19 wherein said polymer part which is not miscible with said polyketone is a polyolefin and wherein said modified acid copolymer part comprises poly(ethene-methacrylic acid) modified with an unhindered primary amine.

* * * * *